United States Patent
Gardziella

[15] 3,699,187
[45] Oct. 17, 1972

[54] HOT MELT ADHESIVES COMPRISING $C_6$ TO $C_{12}$ ALIPHATIC DICARBOXYLIC ACID MODIFIED PHTHALIC ACID POLYESTER MIXTURES

[72] Inventor: Arno Gardziella, Witten-Rudinghausen, Germany

[73] Assignee: Dynamit Nobel Aktiengesellschaft, Troisdorf, Germany

[22] Filed: Dec. 8, 1970

[21] Appl. No.: 96,236

[30] Foreign Application Priority Data

Dec. 13, 1969    Germany..........P 19 62 642.7

[52] U.S. Cl. ..................260/860, 156/332, 161/231, 161/232, 260/40
[51] Int. Cl. ..............................................C08g 39/10
[58] Field of Search ..............260/860; 161/231, 232; 156/332

[56] References Cited

UNITED STATES PATENTS

| | | |
|---|---|---|
| 3,136,677 | 6/1964 | Woker......................156/332 |
| 3,299,172 | 1/1967 | Schade et al. .............260/860 |
| 3,466,348 | 9/1969 | Wiener......................260/860 |

*Primary Examiner*—William H. Short
*Assistant Examiner*—Edward Woodberry
*Attorney*—Burgess, Dinklage & Sprung

[57] ABSTRACT

A polyester-containing hot-melt adhesive for the bonding of materials, based on a phthalic acid, an aliphatic $C_6$ to $C_{12}$ dicarboxylic acid, and a glycol with from two to 10 carbon atoms in the radical between the two OH groups, comprising a. about 20 to 95 wt. percent of a polyester wherein about 5 to 20 mole percent of the dicarboxylic acid component comprises an aliphatic dicarboxylic acid, the polyester having a melting point of over about 150° C, and
b. about 5 to 80 wt. percent of a polyester wherein about 25 to 35 mole percent of the dicarboxylic acid component comprises an aliphatic dicarboxylic acid, the polyester having a melting point between about 50 and 150° C.

4 Claims, No Drawings

HOT MELT ADHESIVES COMPRISING TO ALIPHATIC DICARBOXYLIC ACID MODIFIED PHTHALIC ACID POLYESTER MIXTURES

The invention relates to a special thermoplastic, polyester-based adhesive for bonding materials such as leather, imitation leather, paper, wood, plastics, metals and the like.

Thermoplastic adhesives, also known as hot-melt adhesives, are used to bond materials in a variety of applications. These solvent-free adhesives are applied in the molten state. Upon setting, a bond is formed by the thermoplastic product between the materials to be adhered.

It is known to use polyamides, copolymers based on ethylene, vinyl acetate, acrylate, and the like, as thermoplastic adhesives. Polyesters, among them those based on terephthalic acid, isophthalic acid, aliphatic $C_2$ to $C_{10}$ dicarboxylic acids, and glycols with from two to 10 carbon atoms in the chain between the OH groups, are also used as hot-melt adhesives.

It is an object of the invention to provide improved adhesives producing stronger bonds than heretofore from the same starting materials.

These and other objects and advantages are realized in accordance with the present invention wherein the adhesive comprises mixtures of two or more polyester compositions, each of which may be individually known, rather than a single polyester component. The components include units of terephthalic acid, aliphatic $C_6$ to $C_{12}$ dicarboxylic acids, and glycols with from two to 10 carbon atoms in the chain between the two OH groups, the overall polyester-containing hot-melt adhesive comprising a. from about 20 to 95 weight percent of a polyester of the aforesaid type wherein about 5 to 20 mole percent of the dicarboxylic acid component comprises an aliphatic dicarboxylic acid, the polyester having a melting point of over about 150°C, and b. from about 5 to 80 weight percent of a polyester of the aforesaid type wherein about 25 to 35 mole percent of the dicarboxylic acid component comprises an aliphatic dicarboxylic acid, the polyester having a melting point between about 50° and 150°C.

The balance of the acid component of each polyester is an aromatic dicarboxylic acid, advantageously a phthalic acid and especially terephthalic or isophthalic acid. Terephthalic acid is preferred, optionally replaced by up to about 50 mole percent of isophthalic acid, the isophthalic acid when present in a component being included to the extent of at least about 10 mole percent of the total phthalic acids.

It has been found that mixtures of the aforesaid types have altogether different, or better, adhesive properties for hot-melt bonding than single polyesters of the same overall composition of monomer units as the mixtures in accordance with the invention.

The aliphatic dicarboxylic acids advantageously contain about six to 12 carbon atoms and include, for example, adipic acid, pimelic acid, suberic acid, azelaic acid, sebacic acid, nonanedicarboxylic acid-1,9, decamethylene dicarboxylic acid, and the like. Branched $C_6$ to $C_{12}$ dicarboxylic acids may also be used as well as mixtures of two or more of the foregoing.

Advantageously the glycols contain from about two to 10 atoms between the hydroxyl groups and such intermediate chain may be straight or branched. While the chain preferably comprises carbon atoms it may also contain other elements such as oxygen, e.g., diethylene glycol, triethylene glycol, tetraethylene glycol, 2,2-dimethyl-1,3-bis-($\beta$-hydroxyethoxy) propane, and the like. Other suitable glycols are, for example, ethylene glycol, 1,2- and 1,3-propylene glycol, 2,2-dimethyl-1,3-propanediol, 2,2-diethyl-1,3-propanediol, 2,2-diphenyl-1,3-propanediol, 2,2-dimethoxy-1,3-propanediol, 1,2-, 1,3- and 1,4-butanediol, 2,3-butanediol, 3,3-dimethyl-1,5-pentanediol, 1,6-hexanediol, 1,7-heptanediol, etc., as well as mixtures of the aforesaid glycols.

The starting products for the condensations are used in the purity usual in polycondensations.

The polyesters used to make the mixtures may be prepared by cocondensation by prior-art methods. A few preparative methods will be described in the examples although the polyesters may also be made by other known methods.

In addition, from about 0.01 to 0.3 weight percent, and preferably from about 0.05 to 0.1 weight percent, of an inert, inorganic powder of a particle size smaller than micron size may be incorporated into the polyester mixtures, advantageously in the course of producing the polyester. Suitable inert, inorganic powders are, for example, silicic acid, titanium dioxide, zirconium oxide, aluminum oxide, talc, gypsum, calcium fluoride, kaolin, mica, barium sulfate, calcium carbonate, bentonite or the like, provided that their particle size is under $5\mu$. The inorganic powders are such as will not enter into or cause a reaction with the polyester under manufacturing and/or processing conditions.

While German published application 1,190,984 discloses the addition of from 0.01 to 0.5 weight percent of inorganic powders of a particle size of up to $10\mu$ to linear polyesters, this is for the manufacture of thin foils, and is unrelated to the present invention since the factors entering into the manufacture of thin foils are quite different from those governing the use of a polyester blend of a given composition as a hot-melt adhesive.

The preparation of the starting products and of the mixtures, and the measurements obtained from adhesive joints formed, are shown in the examples which follow:

EXAMPLES 1 TO 5 (PREPARATION OF STARTING PRODUCTS)

A stainless-steel autoclave with agitator was charged with dimethyl terephthalate, dimethyl isophthalate, 1,4-butane-diol, zinc acetate dihydrate, triphenyl phosphite and tetra-n-butyl titanate. The weights of esters and glycols for examples 1 to 5 are given in Table A. In each example there were also added 5 g of zinc acetate dihydrate and 10 g of tetra-n-butyl titanate.

The triphenyl phosphite was added after the ester interchange.

After repeated scavenging with nitrogen, methanol was distilled off at an internal temperature of about 150° to 220°C at normal pressure, following which sebacic acid was added in the specified amount. For esterification of the sebacic acid, the temperature was raised to 250°C and held at that level for about 2 hours. The completeness of esterification was verified by measuring the amount of reaction water distilled over. After introducing 10 g of triphenyl phosphite with a little diol (for the purpose of inhibiting the transesterification catalyst), the vessel was evacuated.

Within 1 hour, the internal temperature was increased to 270°C and the pressure simultaneously reduced to less than 1 mm Hg.

After agitating for 3 to 4 hours under the last-mentioned conditions, the vacuum was broken by introducing nitrogen, and the contents of the autoclave were discharged through the valve in its bottom and granulated. The products so obtained had the viscosity coefficients and melting points given in Table B. Table B further gives the mole ratio of the acids in the polyesters.

The coefficient of viscosity or the reduced viscosity, respectively, of the polyesters was determined at 25°C by the use of a capillary viscosimeter. The reduced viscosity was calculated by the following formula: $\eta$ red $= (\eta - \eta)/\eta_o \cdot 1/c$
where
$\eta$ = viscosity of solution
$\eta_o$ = viscosity of solvent (60 parts by weight phenol + 40 pbw 1,1,2,2-tetrachloroethane)
$c$ = concentration of solution 1 g/100 ml of solvent The melting point was determined by differential thermal analysis, the melting point being given as that temperature at which the last trace of solid disappears.

TABLE A

| Ex. | Dimethyl terephthalate kg | Dimethyl isophthalate kg | Sebacic acid kg | 1,4-butanediol kg |
|---|---|---|---|---|
| 1 | 6.98 | 1.01 | 2.1 | 9.3 |
| 2 | 5.04 | 2.09 | 2.7 | 9.0 |
| 3 | 4.18 | 2.62 | 3.03 | 9.0 |
| 4 | 3.63 | 2.97 | 3.26 | 9.0 |
| 5 | 3.61 | 3.61 | 3.79 | 10.0 |

TABLE B

| Example | Red. viscosity | Approximate Melting Point, °C | Terephthalic: isophthalic: sebacic acid: mole ratios |
|---|---|---|---|
| 1 | 0.83 | 170 | 70:10:20 |
| 2 | 0.85 | 132 | 52:22:26 |
| 3 | 0.84 | 110 | 43:27:30 |
| 4 | 0.87 | 90 | 37:31:32 |
| 5 | 0.83 | 70 | 10:10:10 |

EXAMPLE 6 (PREPARATION OF A FURTHER STARTING PRODUCT)

The following products were caused to react by the same procedure as in examples 1 to 5:
9.7 kg dimethyl terephthalate
3.65 kg adipic acid
7.1 kg 1,6-hexanediol
6.2 kg ethylene glycol
15 g zinc acetate dihydrate
25 g tetra-n-butyl titanate
30 g triphenyl phosphite The polyester obtained, whose terephthalic acid:adipic acid:1,6-hexanediol:ethylene glycol mole ratio is 10:5:12:20, has a viscosity coefficient of 0.82 and a melting point measured by differential thermal analysis of approximately 65°C.

EXAMPLES 7 AND 8 (EXAMPLES IN ACCORDANCE WITH THE INVENTION)

The two polyesters of Examples 1 and 5 were mixed in a weight ratio of 90:10 in Example 7 and 70:30 in Example 8 in a vacuum kneader under nitrogen at about 200°C.

EXAMPLES 9 and AND 10 (EXAMPLES IN ACCORDANCE WITH THE INVENTION)

The two polyesters of Examples 1 and 6 were mixed in a weight ratio of 90:10 in Example 9 and 70:30 in Example 10 in a vacuum kneader under nitrogen at about 200°C.

The polyesters or mixtures, respectively, of Examples 1 to 10 were examined for their adhesive-bonding properties as described below.
Strips 10 mm wide of
a. sheet aluminum
b. polyurethane imitation leather
c. beechwood plates 5 mm thick
d. leather 5 mm thick (smooth-split)
were bonded together in lengths of 10 mm with the polyesters of examples 1 to 10. The bonded strips were then subjected to tension in a tension test machine at a velocity of 100 mm/hr. The forces (in kiloponds/cm$^2$) to failure of the bonded joints are given in the table below:

TABLE C

| Polyester of example | Aluminum to Aluminum | Aluminum to polyurethane imit. leather | Wood to wood | Leather to wood |
|---|---|---|---|---|
| 1 | 8 | 4 | 20 | 20 |
| 2 | 20 | 8 | 30 | 13 |
| 3 | 38 | 9 | 32 | 20 |
| 4 | 40 | 9 | 30 | 24 |
| 5 | 18 | 6 | 35 | 15 |
| 6 | 33 | 13 | 40 | 16 |
| 7 | 68 | Rupture of material | 44 | Rupture of material |
| 8 | 65 | " | 45 | " |
| 9 | 70 | " | 47 | " |
| 10 | 58 | " | 44 | " |

Table C shows that the adhesion of the novel polyester mixtures (examples 7 to 10) is much superior to the adhesive strength of the individual components (examples 1 to 6).

Substantially similar results are realized if 0.1 percent by weight of an inert powder, such as titanium dioxide of 0.5$\mu$, is added during the formation of each of the polyester components. If an inert powder is added, the setting of the polyester will be accelerated.

It will be appreciated that the instant specification and examples are set forth by way of illustration and not limitation, and that various modifications and changes may be made without departing from the spirit and scope of the present invention.

What is claimed is:

1. A polyester-containing hot-melt adhesive for the bonding of materials, based on a phthalic acid, an aliphatic $C_6$ to $C_{12}$ dicarboxylic acid, and a glycol with from two to 10 carbon atoms in the radical between the two OH groups, comprising a. about 20 to 95 wt. % of a polyester wherein about 5 to 20 mole % of the dicarboxylic acid component comprises an aliphatic dicarboxylic acid and about 95 to 80 mole % of the dicarboxylic acid component comprises a phthalic acid, the polyester having a melting point of over 150°C, and b. about 5 to 80 wt. % of a polyester wherein about 25 to 35 mole % of the dicarboxylic acid component comprises an aliphatic dicarboxylic acid and about 75 to 65 mole % of the dicarboxylic acid component comprises a phthalic acid, the polyester having a melting point between about 50° and 150°C.

2. A HOT-melt adhesive according to claim 1, wherein the phthalic acid component of the polyesters comprises terephthalic acid and up to about 50 mole percent of isophthalic acid.

3. A hot-melt adhesive according to claim 1, containing from about 0.01 to 0.3 weight percent of an inert, inorganic powder of a particle size smaller than micron size.

4. A hot-melt adhesive according to claim 2, wherein the phthalic acid of at least one of (a) and (b) comprises at least about 10 mole percent of isophthalic acid, said adhesive containing from about 0.05 to 0.1 percent by weight of an inert inorganic powder of a particle size smaller than $5\mu$.

* * * * *